United States Patent
Kanaris et al.

(10) Patent No.: US 8,704,909 B2
(45) Date of Patent: Apr. 22, 2014

(54) SYSTEMS AND METHODS FOR EFFICIENTLY CODING AND PROCESSING IMAGE DATA

(75) Inventors: Alex Kanaris, San Jose, CA (US); Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 775 days.

(21) Appl. No.: 12/711,079

(22) Filed: Feb. 23, 2010

(65) Prior Publication Data

US 2011/0205382 A1 Aug. 25, 2011

(51) Int. Cl.
- *H04N 5/228* (2006.01)
- *H04N 9/73* (2006.01)
- *G06K 9/00* (2006.01)
- *G06K 9/36* (2006.01)

(52) U.S. Cl.
USPC .......... 348/222.1; 348/223.1; 382/162; 382/167; 382/232

(58) Field of Classification Search
USPC .......... 348/222.1, 223.1, 224.1, 225.1, 229.1, 348/230.1; 382/162, 163, 164, 165, 166, 382/167, 168, 169, 170, 171, 172, 232, 254
See application file for complete search history.

(56) References Cited

U.S. PATENT DOCUMENTS

| | | | |
|---|---|---|---|
| 5,142,380 A * | 8/1992 | Sakagami et al. | 382/250 |
| 6,104,430 A * | 8/2000 | Fukuoka | 348/231.6 |
| 6,721,006 B1 | 4/2004 | Hata | |
| 6,785,335 B1 * | 8/2004 | Layeghi | 375/240.2 |
| 7,254,276 B2 * | 8/2007 | Sugimoto et al. | 382/250 |
| 7,286,703 B2 * | 10/2007 | Kaku | 382/167 |
| 7,456,843 B2 | 11/2008 | Chen et al. | |
| 2002/0057349 A1 | 5/2002 | Yamaguchi et al. | |
| 2005/0275736 A1 | 12/2005 | Chiu et al. | |
| 2006/0050080 A1 | 3/2006 | Chen et al. | |
| 2006/0274156 A1 | 12/2006 | Rabbani et al. | |
| 2007/0070216 A1 | 3/2007 | Yabe | |

* cited by examiner

*Primary Examiner* — Twyler Haskins
*Assistant Examiner* — Peter Chon
(74) *Attorney, Agent, or Firm* — Wong, Cabello, Lutsch, Rutherford & Brucculeri, LLP

(57) ABSTRACT

Systems, methods, and computer-readable media for efficiently coding and processing image data using an electronic device are provided. While both image-quality processing and coding operations may be performed for a frame of captured image data, the electronic device may leverage information generated during one operation in order to more efficiently conduct another operation. For example, an image coding operation may be performed on a first frame of image data by partitioning the image data into blocks of data and transforming the blocks of data into a frequency domain representation or format. Color component statistics from one or more of the blocks of data may be obtained, and an image-quality processing operation may then be performed on the first frame of image data or a subsequent frame of image data using the obtained color component statistics.

19 Claims, 4 Drawing Sheets

400

| Performing an image coding operation on a first frame of image data by partitioning the image data into blocks of data and transforming the blocks of data into a frequency domain representation. 402 |

| Obtaining color component statistics from at least one of the blocks of data. 404 |

| Performing an image-quality processing operation on at least one second frame of image data using the obtained color component statistics. 406 |

| Compressing a first frame of image data. 502 |

| Identifying statistical color information generated during the compressing. 504 |

| Image-quality processing at least one second frame of image data using the identified statistical color information. 506 |

FIG. 5

SYSTEMS AND METHODS FOR EFFICIENTLY CODING AND PROCESSING IMAGE DATA

FIELD OF THE INVENTION

This can relate to systems and methods for handling image data and, more particularly, to systems and methods for efficiently coding and processing image data using an electronic device.

BACKGROUND OF THE DISCLOSURE

Electronic devices, and in particular portable electronic devices (e.g., portable media players and cellular telephones), often include a camera for capturing still and/or video image data. Such an electronic device may store the captured images and/or may display images that have been previously stored or that are currently being captured. The electronic device may be operative to perform certain image-quality processing techniques on the captured image data. For example, an electronic device may perform auto-focus, auto-exposure, or white balance adjustment operations on captured image data to be displayed and/or stored. However, due to processing limitations, power limitations, and other limitations of such electronic devices, certain image-quality processing techniques may be compromised or forsaken.

SUMMARY OF THE DISCLOSURE

Systems, methods, and computer-readable media for efficiently coding and processing image data using an electronic device are provided.

For example, in some embodiments, there is provided a method for handling image data with an electronic device. The method includes performing an image coding operation on a first frame of image data by partitioning the image data into blocks of data and transforming the blocks of data into a frequency domain representation. The method also includes obtaining color component statistics from at least one of the blocks of data and performing an image-quality processing operation on at least one second frame of image data using the obtained color component statistics. The image-quality processing operation may be a white balance adjustment operation that includes determining a reference white point using the obtained color component statistics and adjusting at least some color components of the second frame of image data based on the reference white point. The white balance adjustment operation may sometimes include identifying a chrominance distribution pattern using the obtained color component statistics, comparing the identified chrominance distribution pattern to various illumination presets, distinguishing a particular illumination preset of the various illumination presets based on the similarity between the identified chrominance distribution pattern and a chrominance distribution pattern of the particular illumination preset, and then adjusting the magnitude of at least some color components of the second frame of image data at least partially based on a chrominance compensation setting of the particular illumination preset. The second frame of image data may be the first frame of image data or at least one frame of image data subsequent to the first frame of image data.

In other embodiments, there is provided a method for handling image data with an electronic device that includes compressing a first frame of image data, identifying statistical color information generated during the compressing, and image-quality processing at least one second frame of image data using the identified statistical color information. The second frame of image data may be the first frame of image data or at least one frame of image data subsequent to the first frame of image data.

In yet other embodiments, there is provided an electronic device that includes an encoder operable to partition a first frame of image data into blocks of data, transform the blocks of data into a frequency domain representation, and derive statistical color information from at least some of the blocks of data. The electronic device also includes an image processing engine operable to perform an image-quality processing operation on at least a second frame of image data using the derived statistical color information. The electronic device may also include a first processor operable for use by the encoder to partition the first frame of image data, and a second processor operable for use by the image processing engine to at least partially perform the image-quality processing operation. The second frame of image data may be the first frame of image data or at least one frame of image data subsequent to the first frame of image data.

In other embodiments, there is provided an electronic device that includes a first component and a second component. The first component is operable to code a first frame of image data and share chrominance statistics from the first frame of image data, while the second component is operable to image-quality process at least a second frame of image data based on the shared chrominance statistics. The second frame of image data may be the first frame of image data or at least one frame of image data subsequent to the first frame of image data.

In still yet other embodiments, there is provided a computer readable media for controlling an electronic device, that includes computer readable code recorded thereon for compressing a first frame of image data using an encoder of the device, identifying color component statistics generated during the compressing, and image-quality processing at least a second frame of image data based on the identified color component statistics using an image processing engine of the device. The second frame of image data may be the first frame of image data or at least one frame of image data subsequent to the first frame of image data.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIGS. 3-5 are flowcharts of illustrative processes for handling image data in accordance with some embodiments of the invention.

DETAILED DESCRIPTION OF THE DISCLOSURE

Systems, methods, and computer-readable media for efficiently coding and processing image data using an electronic device are provided and described with reference to FIGS. 1-5.

An electronic device may be operative to handle or otherwise manage image data captured by a camera. For example, one or more image-quality processing operations, such as white balance adjustment and/or auto-exposure, may be performed by the electronic device on the image data before it is displayed to a user. Moreover, one or more coding operations, such as compression and/or encoding, may be performed by the electronic device on the image data before it is stored for later use. While both image-quality processing and coding operations are often performed for a frame of captured image data, an electronic device may leverage information generated during one operation in order to more efficiently conduct another operation.

For example, frame chrominance data may be sub-sampled, partitioned into blocks, and transformed into the frequency domain during an encoding operation on a frame of image data. Certain information generated by robust statistical sampling of a coding operation may be shared with and used by an image-quality processing operation. This may provide for a more efficient handling of image data, for example, by reducing computational redundancy between operations.

Figure 1:
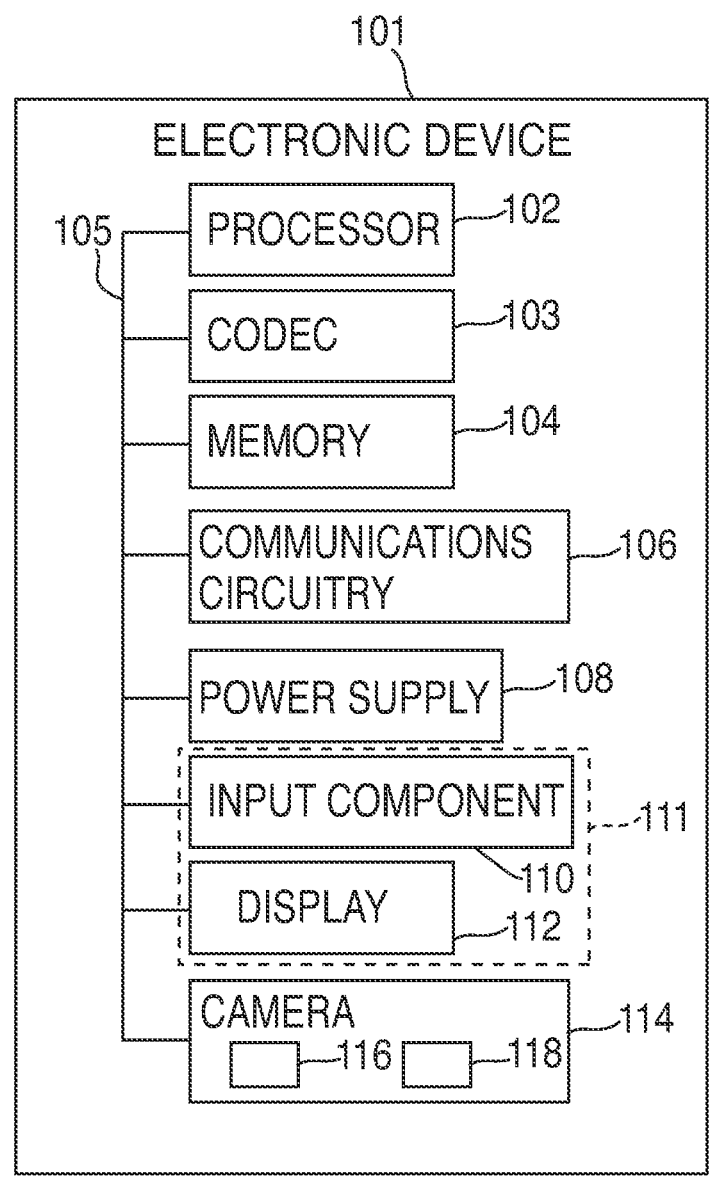
FIGS. 1 and 2 are schematic views of illustrative electronic devices in accordance with some embodiments of the invention.

FIG. 1 is a schematic view of an illustrative electronic device 100 for handling image data in accordance with some embodiments of the invention. Electronic device 100 may be any portable, mobile, or hand-held electronic device configured to process image data wherever the user travels. Alternatively, electronic device 100 may not be portable at all, but may instead be generally stationary. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., desktop, laptop, tablet, server, etc.), monitor, television, stereo equipment, set up box, set-top box, boom box, modem, router, printer, and combinations thereof. In some embodiments, electronic device 100 may perform a single function (e.g., a device dedicated to handling image data) and, in other embodiments, electronic device 100 may perform multiple functions (e.g., a device that captures and processes image data, plays music, and receives and transmits telephone calls).

Electronic device 100 may include a processor or control circuitry 102, memory 104, communications circuitry 106, power supply 108, input component 110, display 112, and camera 114. Electronic device 100 may also include an encoder/decoder and/or compressor/decompressor ("CODEC") 103 that may encode, compress, decode, and/or decompress (e.g., "code") various data signals (e.g., image data signals), and a bus 105 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include motion detection circuitry, light sensing circuitry, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, and combinations thereof. For example, input component 110 may include a multi-touch screen. Each input component 110 can be configured to provide one or more dedicated control functions for making selections or issuing commands associated with operating device 100.

Electronic device 100 may also include one or more output components that may present information (e.g., textual, graphical, audible, and/or tactile information) to a user of device 100. An output component of electronic device 100 may take various forms, including, but not limited to, audio speakers, headphones, audio line-outs, visual displays, antennas, infrared ports, rumblers, vibrators, or combinations thereof.

For example, electronic device 100 may include display 112 as an output component. Display 112 may include any suitable type of display or interface for showing images captured by camera 114. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder through which a user can see the images captured by camera 114. In some embodiments, display 112 may include a viewfinder of the type found in compact digital cameras, reflex cameras, or any other suitable still or video camera.

It should be noted that one or more input components and one or more output components may sometimes be referred to collectively herein as an input/output ("I/O") interface (e.g., input component 110 and display 112 as I/O interface 111). It should also be noted that input component 110 and display 112 may sometimes be a single I/O component, such as a touch screen that may receive input information through a user's touch of a display screen and that may also provide visual information to a user via that same display screen.

Camera 114 may be any suitable component operative to capture images of the surrounding environment of electronic device 100. For example, camera 114 may include a camera optical module 116 and camera sensor circuitry 118. Camera optical module 116 may include any number of optical or digital lenses or other suitable components for receiving light reflected by the user's environment and for focusing or otherwise directing that received light to camera sensor circuitry 118, which may convert the light into raw image data. Raw image data signals that may be generated by camera 114 may be handled or managed (e.g., coded and/or processed) by electronic device 100 and may be stored as individual distinct images or as consecutive video frame images of a recording. As used herein, the term "camera" may be understood to mean a component including an optical module for receiving light and sensor circuitry for capturing and converting the received light into raw image data that can be processed, displayed, coded, and/or stored by electronic device 100 as either an individual distinct image or as one of many consecutive video frame images. Furthermore, as used herein, the term "handling" may be understood to encompass all manners in which image data might be manipulated, operated upon, managed, or transformed, including, but not limited to, coding, encoding, decoding, compressing, decompressing, image-quality processing, white point balancing, and the like.

Processor 102 of device 100 may include any processing circuitry operative to control the operations and performance of one or more components of electronic device 100. For example, processor 102 may be used to run operating system applications, firmware applications, media playback applications, media editing applications, or any other application. In some embodiments, processor 102 may receive input signals from input component 110 and/or drive output signals through display 112. Processor 102 may load a user interface program (e.g., a program stored in memory 104 or another device or server) to determine how instructions or data received via an input component 110 or camera 114 may manipulate the way in which information is stored and/or provided to the user via an output component (e.g., display 112). Processor 102 may associate different metadata with the images captured by camera 114, including, for example, positioning information, device movement information, a time code, a device identifier, or any other suitable metadata. Electronic device 100 (e.g., processor 102, any circuitry of camera 114, or any other components available to device 100) may be configured to capture images with camera 114 at various resolutions, frequencies, intensities, and various other characteristics as may be appropriate for the capabilities and resources of device 100.

Electronic device 100 may also be provided with a housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
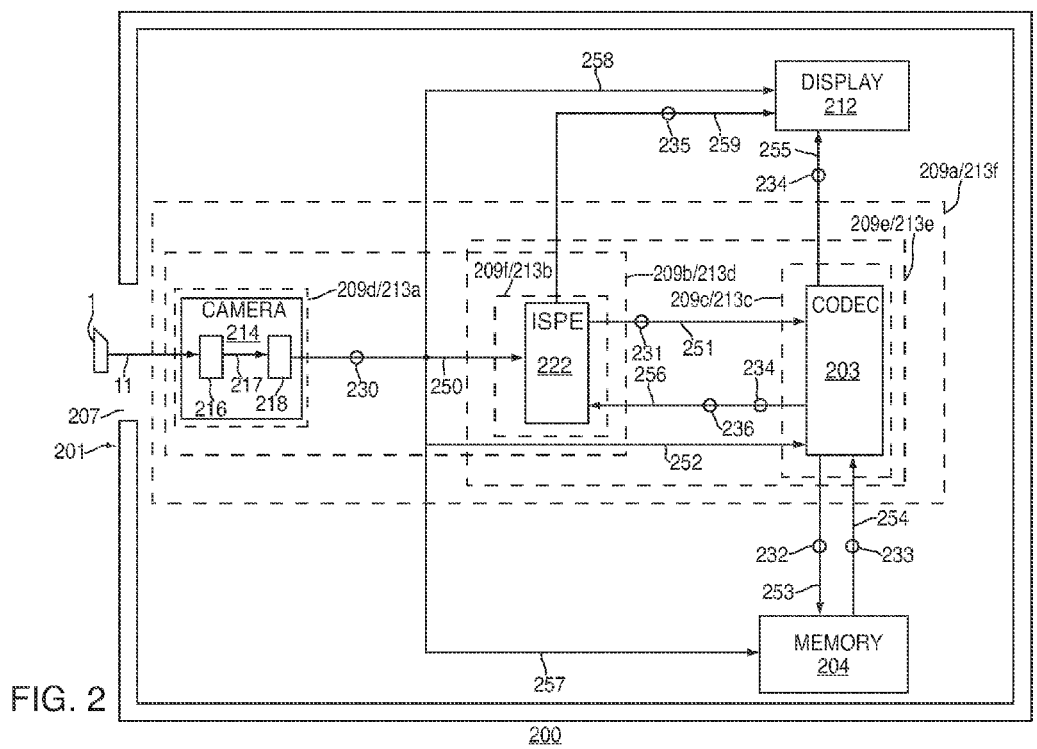

FIG. 2 shows an illustrative electronic device 200. Electronic device 200 may include some or all of the features of electronic device 100 of FIG. 1. In particular, as shown in FIG. 2, for example, electronic device 200 may include a CODEC 203, memory 204, display 212, and a camera 214. Camera 214 may include a camera optical module 216 and camera sensor circuitry 218, and camera optical module 216 may be positioned at an opening 207 through housing 201 of device 200 for receiving object light 11 reflected by an object 1 external to housing 201. Optical module 216 may include one or more lenses and/or other optical elements for receiving object light 11 and for focusing or otherwise directing that received light to camera sensor circuitry 218 (e.g., as directed light 217). Optical module 216 may include various optical elements for directing received light 11 to camera sensor circuitry 218 as directed light 217 including, for example, one or more digital or optical lenses, one or more driving mechanisms for moving a lens for focusing or zooming, one or more shutters, one or more aperture diaphragms, one or more beam splitters and/or prisms, and the like.

Camera sensor circuitry 218 may receive directed light 217 from optical module 216 and may convert the light into raw image data 230. Camera sensor circuitry 218 may include one or more various types of camera circuitry, such as charge coupled device ("CCD") sensor circuitry and/or complimentary metal oxide semiconductor ("CMOS") sensor circuitry. In some embodiments, camera sensor circuitry 218 may include a single CCD sensor or a single CMOS sensor, and a physical location in a sensor of camera sensor circuitry 218, such as a pixel, may be configured to receive a single primary color (e.g., red, green, or blue) while neighboring pixels may be assigned to receive different colors. The neighboring values may be used to estimate all three primary color values at each pixel. In other embodiments, camera sensor circuitry 218 may include multiple sensors. For example, camera sensor circuitry 218 may include three CCD sensors, and one sensor may be deployed for each primary color (e.g., one for green, one for red, and one for blue). Camera optical module 216 may include a beam splitter or prism to direct light 11 as distinct portions of light 217 to corresponding sensors of sensor circuitry 218 for an associated primary color.

Raw image data 230 that may be output from sensor circuitry 218 of camera 214 may be a raw signal comprising red, green, and blue values for each pixel (e.g., "an RGB signal"). Raw image data 230 that may be generated by camera 214 may be processed, displayed, coded, and/or stored by other components of electronic device 200 as an individual distinct image or as one of many consecutive video frame images.

For example, as shown in FIG. 2, electronic device 200 may include an image signal processing engine ("ISPE") 222 that may perform one or more image-quality processing operations on raw image data 230, which may be received by ISPE 222 from camera 214 via a communication link 250. In some embodiments, ISPE 222 may perform all or part of one or more types of image-quality processing operation on raw image data 230, including, but not limited to, auto-focus, auto-exposure, white balance adjustment, and the like. Additionally or alternatively, ISPE 222 may convert received raw image data 230 from an RGB or primary color space output format into a $YC_bC_r$ or component color space output format, which may contain the chrominance information and the luminance information of the image data in separate channels. Therefore, in some embodiments, ISPE 222 may perform all or part of one or more of the image-quality processing operations on received image data after the received image data has been converted into a component color space format (e.g., by a format conversion operation performed by ISPE 222 itself or by any other component of device 200). In other embodiments, ISPE 222 may perform all or part of one or more of the image-quality processing operations on received image data that is in a primary color space format (e.g., raw image data 230), and then ISPE 222 may convert the at least partially processed image data into a component color space format. ISPE 222 may include or otherwise utilize hardware (e.g., one or more processors) and/or software (e.g., one or more algorithms) to perform at least part of one or more image-quality processing operations and/or to perform one or more color space format conversion operations on image data.

As shown in FIG. 2, electronic device 200 may also include a CODEC 203 that may code (e.g., encode, decode, compress, and/or decompress) image data for storage or for use with other device components. For example, CODEC 203 may receive image data 231 from ISPE 222 via a communication link 251, which may be image data that has been converted into a component color space format by ISPE 222 and/or image data that has been at least partially processed by one or more image-quality processing operations performed by ISPE 222. Alternatively or additionally, CODEC 203 may receive raw image data 230 from camera 214 via a communication link 252. In some embodiments, CODEC 203 may convert received image data 230 and/or received image data 231 from a primary color space format into a component color space format. However, as mentioned, received image data 231 may already have been converted into a component color space format by ISPE 222. Alternatively or additionally, CODEC 203 may also encode and/or compress received image data 230 and/or received image data 231 (e.g., for the purposes of standardization, speed, secrecy, security, space conservation, or the like). Then, CODEC 203 may send encoded and/or compressed image data 232 via a communication link 253 to memory 204 for storing encoded and/or compressed image data 232.

In some embodiments, CODEC 203 may also receive stored image data 233 from memory 204 via a communication link 254, and CODEC 203 may then decode and/or decompress stored image data 233 for use by other components of device 200. For example, CODEC 203 may send decoded and/or decompressed image data 234 via a communication link 255 to display 212 for presenting the previously stored image data. Alternatively or additionally, CODEC 203 may send decoded and/or decompressed image data 234 via a communication link 256 to ISPE 222 for performing one or more image-quality processing operations and/or one or more color space format conversion operations on the previously stored image data. CODEC 203 may include or otherwise utilize hardware (e.g., one or more processors) and/or software (e.g., one or more algorithms) to perform one or more encoding, decoding, compressing, and/or decompressing operations on received image data. CODEC 203 may follow any suitable standard or standards (e.g., an H264 standard).

Electronic device 200 may include one or more circuit boards and/or one or more chips. In some embodiments, for example, electronic device 200 may include a board 209a that may be a central or primary printed circuit board ("PCB") or motherboard of device 200, and may also be known as a main circuit board, mainboard, baseboard, system board, planar board, or logic board. Board 209a may provide attachment points for one or more of the other electronic components of electronic device 200. For example, as shown in FIG. 2, camera sensor circuitry 218, ISPE 222, and CODEC 203 may all be provided on single board 209a. Board 209a may include one or more chips, chipsets, or specialized groups of integrated circuits mounted thereon. For example, circuit board 209a may include a first chip 213a, a second chip 213b, and a third chip 213c, while camera sensor circuitry 218 may be integrated on first chip 213a, ISPE 222 may be integrated on second chip 213b, and CODEC 203 may be integrated on third chip 213c.

In other embodiments, board 209a may include two chips 213c and 213d. CODEC 203 may be integrated on chip 213c, while camera sensor circuitry 218 and ISPE 222 may be integrated on the same chip 213d (e.g., a CMOS sensor integrated with image processing components on a single integrated circuit). Alternatively, board 209a may include two chips 213a and 213e. Camera sensor circuitry 218 may be integrated on chip 213a, while ISPE 222 and CODEC 203 may be integrated on the same chip 213e. In yet other embodiments, board 209a may include chip 213f, and camera sensor circuitry 218, ISPE 222, and CODEC 203 may all be integrated on the same chip 213f.

Rather than including only a single board, electronic device 200 may include two or more boards, and each board may be electrically coupled to one another in various ways (e.g., via communication links). For example, as shown in FIG. 2, device 200 may include a first board 209b and a second board 209c. First board 209b may provide attachment points for both camera sensor circuitry 218 and ISPE 222, which may be integrated on the same chip 213d or on separate chips 213a and 213b, respectively, while second board 209c may provide one or more attachment points for CODEC 203, which may be integrated on chip 213c. As another example, device 200 may include boards 209d and 209e. Board 209e may provide attachment points for both ISPE 222 and CODEC 203, which may be integrated on the same chip 213e or on separate chips 213b and 213c, respectively, while other board 209d may provide one or more attachment points for camera sensor circuitry 218, which may be integrated on chip 213a. In yet other embodiments, electronic device 200 may include three or more boards, such as boards 209c, 209d, and 209f. Board 209c may provide one or more attachment points for CODEC 203, which may be integrated on chip 213c, board 209d may provide one or more attachment points for camera sensor circuitry 218, which may be integrated on chip 213a, and board 209f may provide one or more attachment points for ISPE 222, which may be integrated on chip 213b.

Therefore, at least camera sensor circuitry 218, ISPE 222, and CODEC 203 may each be integrated on its own chip or on the same chip as one or more other components of device 200, and each chip of device 200 may be mounted on its own board or on the same board as other chips or components of device 200. Various separate components, such as chips of various types, may be used in an image-processing pipeline. A raw signal may be introduced to a first module to convert the signal into a component color space format, while further processing may be performed on an alternate processor. In other embodiments, a raw signal may be delivered to a processor, which may perform all conversion and image processing functions, along with any other processes applicable to that embodiment. In some embodiments, one or more image modules or components may include their own processors or may be combined with a processor used for communications and/or other multi-media processing (e.g., a main central processing unit ("CPU") of device 200). Alternatively, image processing modules may be combined with an integrated circuit comprising one or more processors used for various types of applications. ISPE 222, CODEC 203, and a general processing unit of device 200 (e.g., processor 102) may be physically separate components, or they may be combined as separate dies in a multi-die package, or they may be combined as separate blocks on a common die (e.g., silicon die). One skilled in the art may understand that the control path, data path, and data flow between the three modules may be essentially the same in each one of these various implementations.

As shown in FIG. 2, electronic device 200 may also include memory 204. As mentioned, memory 204 may receive encoded and/or compressed image data 232 from CODEC 203 via communication link 253, as well as send stored image data 233 to CODEC 203 via communication link 254. Additionally or alternatively, in some embodiments, memory 204 may receive raw image data 230 from camera 214 via a communication link 257 for storage in memory 204. Besides storing image data, memory 204 may also store firmware or other applications that may be used to control the operation of ISPE 222 and/or CODEC 203 as well as various procedures and methods of the invention. Memory 204 may include one or more memory components of various types, each of which may be independent of any other component of device 200 or embedded in whole or in part within CODEC 203, ISPE 222, and/or any other component of device 200.

As shown in FIG. 2, electronic device 200 may also include display 212. As mentioned, display 212 may receive decoded and/or decompressed image data 234 from CODEC 203 via communication link 255 for presenting the received image data. Additionally or alternatively, in some embodiments, display 212 may receive raw image data 230 from camera 214 via a communication link 258 or at least partially processed image data 235 from ISPE 222 via a communication link 259 for presenting the received image data. Display 212 may include one or more display drivers for converting any type of received image data into an image signal capable of being displayed by display 212. For example, display 212 may include an image driver for converting received image data from a component color space format into a primary color space format.

Figure 3:
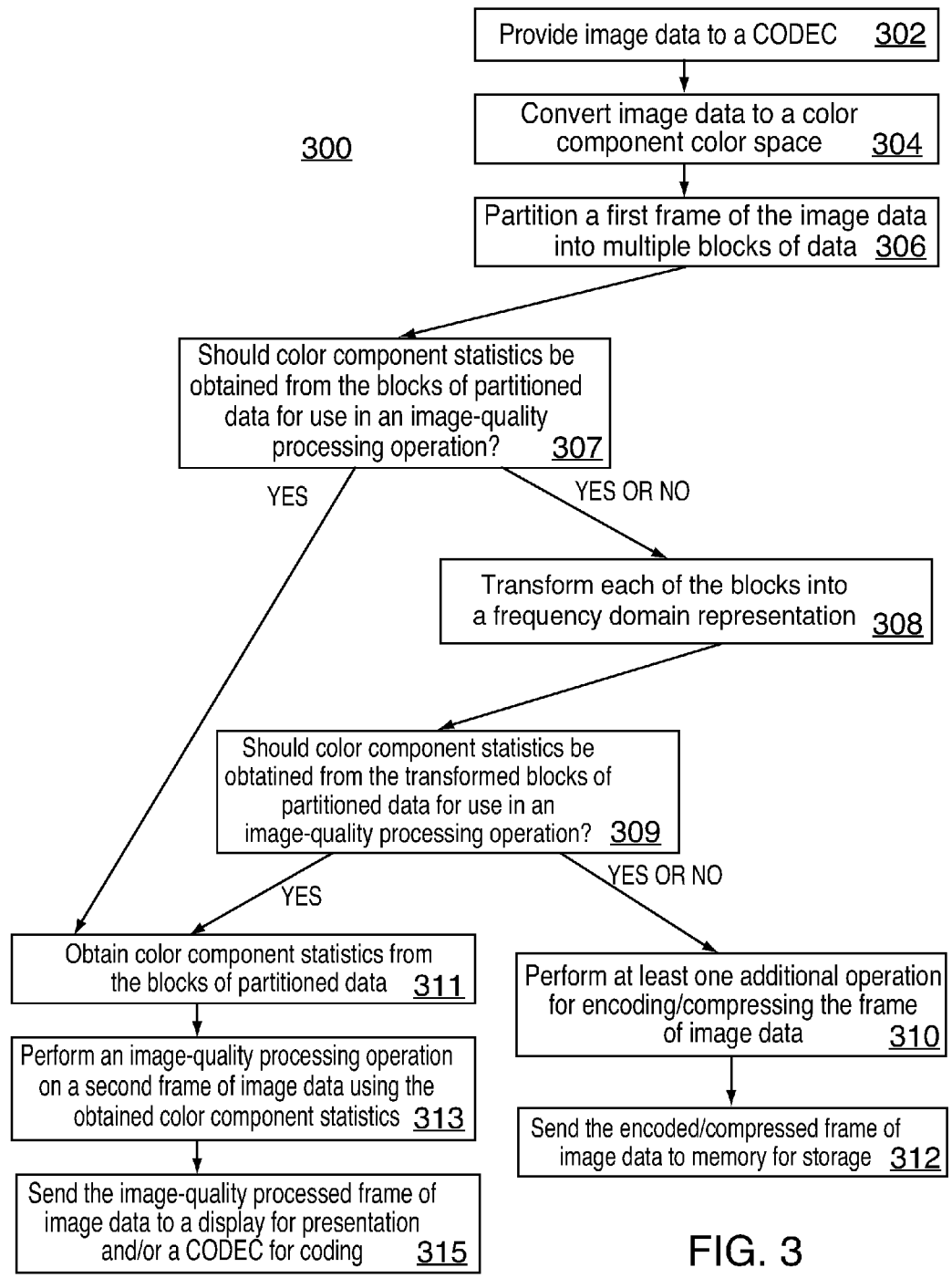

FIG. 3 shows a flowchart of an illustrative process 300 for efficiently handling image data to reduce the amount of power and/or processing required by an electronic device. Process 300 is often described with reference to the various device components of electronic device 100 of FIG. 1 and electronic device 200 of FIG. 2, although any other suitable electronic device may operate according to process 300. Moreover, process 300 is often described with specific reference to an image processing engine performing a white balance adjustment operation, although process 300 may be followed by a device performing any suitable image-quality processing operation that may or may not use any suitable device component.

Process 300 may begin at step 302 by providing image data to a CODEC of an electronic device. As mentioned, CODEC 203 of electronic device 200 may encode and/or compress received image data 230 from camera 214 and/or received image data 231 from ISPE 222. Next, at step 304, the received image data may be converted from a primary color space format to a component color space format. For example, CODEC 203 may convert received image data 230 and/or received image data 231 from a primary color space format into a component color space format. However, as mentioned, received image data 231 may already have been converted into a component color space format by ISPE 222, such that step 304 may be skipped in some embodiments.

Next, at step 306, the CODEC may partition or otherwise split a first frame of the received image data into multiple blocks of data. For example, CODEC 203 may partition a frame of image data into multiple blocks of image data, and each block of image data may include an array of pixels (e.g., an array of 4 by 4 pixels or 8 by 8 pixels). Then at step 308, the CODEC may transform each block into a frequency domain representation or format. For example, CODEC 203 may utilize a discrete cosine transform to transform each block into a frequency spectrum. In some embodiments, for each block, each of the Y, Cb, and Cr data portions of image data in a component color space format may undergo a transform. Then, at step 310, the CODEC may perform one or more additional operations for encoding/compressing the image data into an encoded/compressed data stream for the frame of image data. At step 312, the encoded/compressed data can then be sent to memory for storage. For example, the amplitudes of the frequency components may be quantized and provided in a data stream by CODEC 203 at step 310 (e.g., as data 232) for storage in memory 204 at step 312.

In order to reduce the amount of power and/or processing required by an electronic device, process 300 may allow for an image-quality processing operation to leverage some of the coding steps performed by a CODEC for encoding/compressing image data. For example, before the CODEC transforms each block of partitioned data at step 308, process 300 may proceed from step 306 to step 307. At step 307, electronic device 200 may determine whether color component statistics (e.g., chrominance statistics and/or luminance statistics) should be obtained from the blocks of partitioned data for use in an image-quality processing operation. For example, firmware utilized by CODEC 203, ISPE 222, and/or any application run by device 200 may be configured to determine whether certain data generated by CODEC 203 should be shared with other components or processes of device 200. If it is determined at step 307 that color component statistics should be obtained from the blocks of partitioned data for use in an image-quality processing operation, process 300 may proceed to step 311 for obtaining the color component statistics. Moreover, if it is determined at step 307 that color component statistics should be obtained from the blocks of partitioned data for use in an image-quality processing operation, besides proceeding to step 311, process 300 may also proceed to step 308 such that the CODEC may continue coding the image data (e.g., by transforming each block into a frequency domain representation at step 308). However, if it is determined at step 307 that color component statistics should not be obtained from the blocks of partitioned data, process 300 may proceed only to step 308 and not also to step 311.

In some embodiments, rather than or in addition to obtaining color component statistics from the blocks of data after step 306 (e.g., in response to a determination made at step 307), the CODEC may transform each block of partitioned data at step 308, and then process 300 may proceed from step 308 to step 309, where electronic device 200 may determine whether color component statistics should be obtained from the transformed blocks of partitioned data for use in an image-quality processing operation. For example, firmware utilized by CODEC 203, ISPE 222, and/or any application run by device 200 may be configured to determine whether certain data generated by CODEC 203 should be shared with other components or processes of device 200. If it is determined at step 309 that color component statistics should be obtained from the transformed blocks of partitioned data for use in an image-quality processing operation, process 300 may proceed to step 311 for obtaining the color component statistics. Moreover, if it is determined at step 309 that color component statistics should be obtained from the transformed blocks of partitioned data for use in an image-quality processing operation, besides proceeding to step 311, process 300 may also proceed to step 310 such that the CODEC may continue coding the image data (e.g., by performing one or more additional operations for encoding/compressing the image data at step 310). However, if it is determined at step 309 that color component statistics should not be obtained from the transformed blocks of partitioned data, process 300 may proceed only to step 310 and not also to step 311.

If process 300 does proceed to step 311, either as a result of step 307 and/or step 309, color component statistics may be derived or otherwise obtained from one or more of the blocks of partitioned data at step 311. The color component statistics obtained from any number of the blocks of partitioned data at step 311 may be any suitable statistical information that can be utilized by one or more image-quality processing operations of device 200. In some embodiments, this step may be accomplished by processing capabilities of the CODEC. For example, CODEC 203 may calculate the chrominance of some or all of the pixels in some or all of the blocks, and then may generate average chrominance statistics for some or all of the blocks based on these calculations. Such chrominance statistics may be provided to ISPE 222 as shared data 236 via communication link 256. Alternatively, step 311 may be accomplished by processing capabilities of a device component different from the CODEC. For example, CODEC may share data from one or more of the blocks of partitioned data with ISPE 222 (e.g., as shared data 236 via communication link 256), and ISPE 222 may derive the color component statistics from this shared data at step 311. In some embodiments, color component statistics may be obtained from the blocks of partitioned data at step 311 before the blocks of partitioned data are transformed at step 308. In other embodiments, color component statistics may be obtained from the blocks of partitioned data at step 311 after the blocks of partitioned data are transformed at step 308. While in yet other embodiments, color component statistics may be obtained from the blocks of partitioned data at step 311 at least partially during the transformation of the blocks of partitioned data at step 308.

For example, by obtaining average chrominance statistics for some or all of the blocks of partitioned data, a chrominance histogram for the entire image data frame may be produced. Using the derived chrominance histogram, a probability density function of the chrominance components of the image may be estimated. In other embodiments, average luminance statistics for some or all of the blocks of partitioned data may be derived, and a luminance histogram for the entire image data frame may be produced. Information derived from the luminance histogram may be used as a weighting function when calculating the contribution of the chrominance of each block in the overall color balance, for example, to achieve automatic exposure compensation.

After step 311, process 300 may advance to step 313 and an image-quality processing operation may be performed on a second frame of image data using the color component statistics derived at step 311. The second frame of image data may be the first frame of image data or another frame of image data subsequent to the first frame of image data. The image-quality processing operation performed at step 313 may be accomplished by processing capabilities of a device component different from the CODEC. For example, ISPE 222 may perform an image-quality processing operation using the color component statistics obtained at step 311. In some embodiments, whether the color component statistics are obtained at step 311 by ISPE 222 using shared data provided by CODEC 203 or whether the color component statistics are obtained at step 311 by CODEC 203 and then shared with ISPE 222, ISPE 222 may use the obtained color component statistics at step 313 to perform an image-quality processing operation. For example, the second frame of image data may be provided to ISPE 222 as received image data 230 from camera 214 and/or as at least a portion of shared data 236 via communication link 256 from CODEC 203.

The image-quality processing operation performed at step 313 may be any suitable operation that may utilize the obtained color component statistics. In some embodiments, the image-quality processing operation performed at step 313 may be a white balance adjustment operation. For example, such a white balance adjustment operation may include determining a reference white point using the obtained color component statistics, and then adjusting at least some of the color components of a frame of image data based on the reference white point. In some embodiments, the magnitude of at least some of the color components of at least one second frame of image data, which may include the first frame of image data or one or more frames subsequent to the first frame of image data, may be adjusted based on the reference white point determined using the obtained color component statistics from the first frame of image data. As another example, such a white balance adjustment operation may include identifying a chrominance distribution pattern using the color component statistics.

In some embodiments, a chrominance distribution pattern may be determined by weighting the chrominance statistics of certain portions of the frame of image data (e.g., the statistics from certain partitioned blocks associated with the highlights of the image) over the chrominance statistics of other portions of the frame of image data. This may help to identify the color temperature of the illumination source of the image data. This identified chrominance distribution pattern may be compared with various illumination presets that may be available to device 200. For example, information associated with various illumination presets, such as "sunny", "cloudy", "incandescent light", "fluorescent light", and various other common illumination sources, may be stored in memory 204 or otherwise made available to device 200. This information may include a chrominance distribution pattern and a chrominance compensation setting associated with each illumination preset. During the comparing, a particular illumination preset may be distinguished based on the similarity between the identified chrominance distribution pattern and a chrominance distribution pattern of the particular illumination preset. Then, at least some of the color components of certain frames of image data (e.g., the first frame of image data and/or subsequent frames of image data) may be at least partially adjusted based on the chrominance compensation setting of the particular illumination preset. In other embodiments, as mentioned above, the image-quality processing operation performed at step 313 may be an auto-exposure image-quality processing operation.

After step 313, process 300 may advance to step 315 and the image-quality processed frame of image data may be sent to a display for presentation and/or to a CODEC for coding. For example, as shown in FIG. 2, ISPE 222 may send processed image data 235 to display 212 via communication link 259. Alternatively or additionally, as shown in FIG. 2, ISPE 222 may send processed image data as data 231 to CODEC 203 via communication link 251. For example, the image-quality processing of step 313 may be performed on the second frame of image data in a primary color space format, in which case the processed image data may be sent at step 315 to a CODEC portion operating on image data in a primary color space format (e.g., before step 304 of process 300). Alternatively, the image-quality processing of step 313 may be performed on the second frame of image data in a color component space format, in which case the processed image data may be sent at step 315 to a CODEC portion operating on image data in a color component space format (e.g., after step 304 of process 300).

FIG. 4 shows a flowchart of another illustrative process 400 for handling image data with an electronic device. Process 400 may begin at step 402 by performing an image coding operation on a first frame of image data. For example, step 402 may include partitioning the image data into blocks of data and transforming the blocks of data into a frequency domain representation or format. Process 400 may also include step 404, where color component statistics may be derived or otherwise obtained from at least one of the blocks of data. Then, at step 406, an image-quality processing operation may be performed on at least one second frame of image data using the color component statistics obtained at step 404.

The image-quality processing operation performed at step 406 can be a white balance adjustment operation that may include determining a reference white point using the obtained color component statistics and adjusting at least some color components of the second frame of image data based on the reference white point. The white balance adjustment operation may sometimes include identifying a chrominance distribution pattern using the obtained color component statistics, comparing the identified chrominance distribution pattern to various illumination presets, distinguishing a particular illumination preset of the various illumination presets based on the similarity between the identified chrominance distribution pattern and a chrominance distribution pattern of the particular illumination preset, and then adjusting the magnitude of at least some color components of the second frame of image data at least partially based on a chrominance compensation setting of the particular illumination preset. The second frame of image data may be the first frame of image data on which an image coding operation is performed at step 402. Alternatively or additionally, the second frame of image data may be at least one frame of image data that is subsequent to the first frame of image data.

FIG. 5 shows a flowchart of another illustrative process 500 for handling image data with an electronic device. Process 500 may begin at step 502 by compressing a first frame of image data. Next, statistical color information generated during the compressing may be identified at step 504. Then, at step 506, an image-quality processing operation may be performed on at least one second frame of image data using the statistical color information identified at step 504. The second frame of image data may be the first frame of image data compressed at step 502. Alternatively or additionally, the second frame of image data may be at least one frame of image data that is subsequent to the first frame of image data.

It is understood that the steps shown in each one of processes 300, 400, and 500 of FIGS. 3-5 are merely illustrative and that existing steps may be modified or omitted, additional steps may be added, and the order of certain steps may be altered.

The processes described with respect to FIGS. 3-5, as well as any other aspects of the invention, may each be implemented by software, but can also be implemented in hardware or a combination of hardware and software. They each may also be embodied as computer readable code recorded on a computer readable medium. The computer readable medium may be any data storage device that can store data which can thereafter be read by a computer system. Examples of the computer readable medium include read-only memory, random-access memory, flash memory, CD-ROMs, DVDs, magnetic tape, and optical data storage devices (e.g., memory 104 of FIG. 1 and/or memory 204 of FIG. 2). The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for handling image data with an electronic device comprising:
   performing an image coding operation on a first frame of image data comprising:
      partitioning the image data into a plurality of blocks of data; and
      transforming the plurality of blocks of data into a frequency domain representation;
   obtaining color component statistics data from at least one of the plurality of transformed blocks of data; and
   performing a white balance adjustment operation on at least one second frame of image data using the obtained color component statistics data,
   wherein the white balance adjustment operation comprises:
      weighting one or more portions of the obtained color component statistics data based, at least in part, on information derived from a luminance histogram for the first frame of image data;
      determining a reference white point using at least some of the weighted color component statistics data; and
      adjusting at least some color components of the at least one second frame of image data based, at least in part, on the reference white point.

2. The method of claim 1, wherein the obtaining comprises obtaining the color component statistics from each one of the plurality of transformed blocks of data.

3. The method of claim 1, further comprising:
   using an encoder of the device for the performing the image coding operation; and
   using an image signal processing engine of the device for the performing the white balance adjustment operation.

4. The method of claim 3, wherein:
   the encoder is integrated on a first chip of the device; and the image signal processing engine is integrated on a second chip of the device.

5. The method of claim 3, wherein:
the encoder is mounted on a first board of the device; and
the image signal processing engine is mounted on a second board of the device.

6. The method of claim 1, wherein the performing the white balance adjustment operation further comprises:
identifying a chrominance distribution pattern using at least some of the obtained color component statistics data;
comparing the identified chrominance distribution pattern to a plurality of illumination presets;
distinguishing a particular illumination preset of the plurality of illumination presets based on a similarity between the identified chrominance distribution pattern and a chrominance distribution pattern of the particular illumination preset; and
adjusting the magnitude of at least some color component statistics of the at least one second frame of image data at least partially based on a chrominance compensation setting of the particular illumination preset.

7. The method of claim 1, wherein the at least one second frame of image data comprises the first frame of image data.

8. The method of claim 1, wherein the at least one second frame of image data comprises at least one frame of image data subsequent to the first frame of image data.

9. A method for handling image data with an electronic device comprising:
compressing a first frame of image data;
identifying statistical color information generated during the compressing; and
performing a white balance adjustment operation on at least one second frame of image data using the identified statistical color information,
wherein the white balance adjustment operation comprises:
weighting one or more portions of the identified statistical color information based, at least in part, on information derived from a luminance histogram for the first frame of image data;
determining a reference white point using at least some of the weighted identified statistical color information; and
adjusting at least some color components of the at least one second frame of image data based, at least in part, on the reference white point.

10. The method of claim 9, wherein the compressing comprises:
partitioning the first frame of image data into a plurality of blocks of data; and
transforming the plurality of blocks of data into a frequency domain representation.

11. The method of claim 9, wherein the at least one second frame of image data comprises at least one of the first frame of image data and at least one frame of image data subsequent to the first frame of image data.

12. An electronic device comprising:
an encoder operable to:
partition a first frame of image data into a plurality of blocks of data;
transform the plurality of blocks of data into a frequency domain representation; and
derive statistical color information from at least some of the plurality of transformed blocks of data; and an image processing engine operable to perform a white balance adjustment operation on at least one second frame of image data using the derived statistical color information,
wherein the white balance adjustment operation comprises:
weighting one or more portions of the derived statistical color information based, at least in part, on information derived from a luminance histogram for the first frame of image data;
determining a reference white point using at least some of the weighted derived statistical color information; and
adjusting at least some color components of the at least one second frame of image data based, at least in part, on the reference white point.

13. The electronic device of claim 12, further comprising:
a first processor operable for use by the encoder to partition the first frame of image data; and
a second processor operable for use by the image processing engine to at least partially perform the white balance adjustment operation.

14. The electronic device of claim 12, wherein the encoder is further operable to convert the first frame of image data from a primary color space format to a component color space format.

15. The electronic device of claim 12, wherein the at least a second frame of image data comprises at least one of the first frame of image data and at least one frame of image data subsequent to the first frame of image data.

16. An electronic device comprising:
a first component operable to:
code a first frame of image data; and
share color component statistics data from the first frame of image data; and
a second component operable to perform a white balance adjustment operation on at least one second frame of image data using the shared color component statistics data,
wherein the white balance adjustment operation comprises:
weighting one or more portions of the shared color component statistics data based, at least in part, on information derived from a luminance histogram for the first frame of image data;
determining a reference white point using at least some of the weighted shared color component statistics; and
adjusting at least some color components of the at least one second frame of image data based, at least in part, on the reference white point.

17. The electronic device of claim 16, wherein the first component is operable to code the first frame of image data using an H264 standard.

18. The electronic device of claim 16, wherein the at least a second frame of image data comprises at least one of the first frame of image data and at least one frame of image data subsequent to the first frame of image data.

19. A non-transitory computer readable media for controlling an electronic device, comprising computer readable code recorded thereon for:
compressing a first frame of image data using an encoder of the device;
identifying color component statistics data generated during the compressing; and performing a white balance adjustment operation on at least one second frame of image data using the identified color component statistics data, wherein the white balance adjustment operation comprises:

weighting one or more portions of the identified color component statistics data based, at least in part, on information derived from a luminance histogram for the first frame of image data;

determining a reference white point using at least some of the weighted identified color component statistics; and adjusting at least some color components of the at least one second frame of image data based, at least in part, on the reference white point.

* * * * *

UNITED STATES PATENT AND TRADEMARK OFFICE
CERTIFICATE OF CORRECTION

PATENT NO.      : 8,704,909 B2                                                   Page 1 of 1
APPLICATION NO. : 12/711079
DATED           : April 22, 2014
INVENTOR(S)     : Alex Kanaris et al.

It is certified that error appears in the above-identified patent and that said Letters Patent is hereby corrected as shown below:

In The Claims

Column 14, line 62 (Claim 3, line 2), replace "the performing the" with --performing the--.

Column 14, line 65 (Claim 3, line 5), replace "the performing the" with --performing the--.

Column 15, line 7 (Claim 6, line 1), replace "the performing the" with --performing the--.

Column 16, line 29 (Claim 15, line 2), replace "a second" with --one second--.

Column 16, line 58 (Claim 18, line 2), replace "a second" with --one second--.

Column 16, line 61 (Claim 19, line 1), replace "media" with --medium--.

Signed and Sealed this
Twenty-third Day of December, 2014

Michelle K. Lee
*Deputy Director of the United States Patent and Trademark Office*